(Model.)
S. BROWN.
MACHINE FOR CRUSHING FLAX BOLLS.
No. 251,691. Patented Jan. 3, 1882.
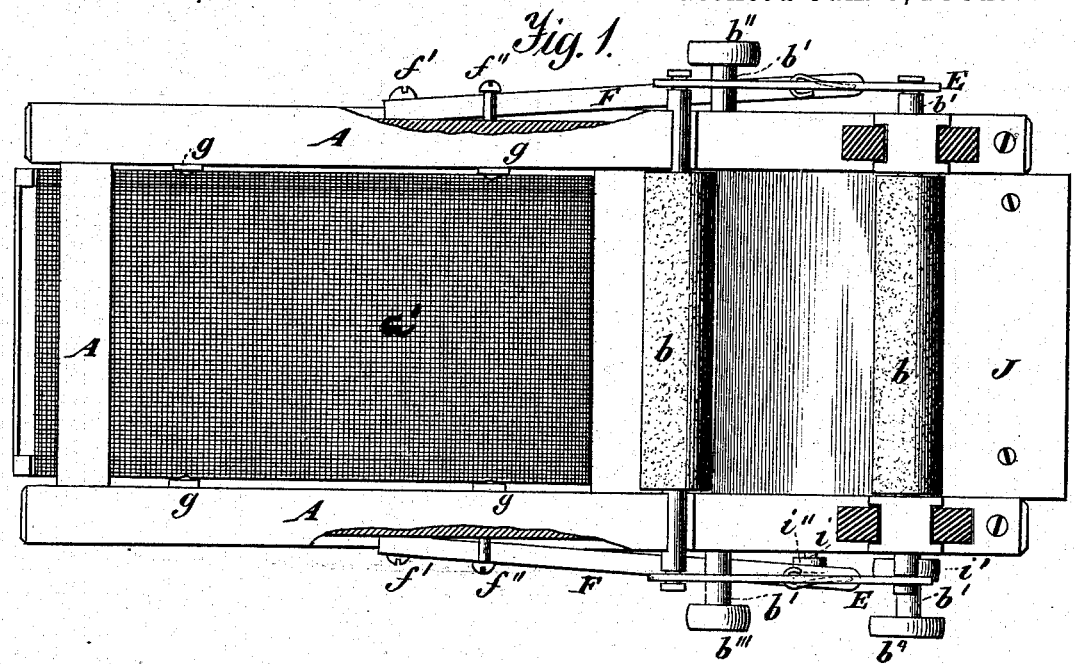
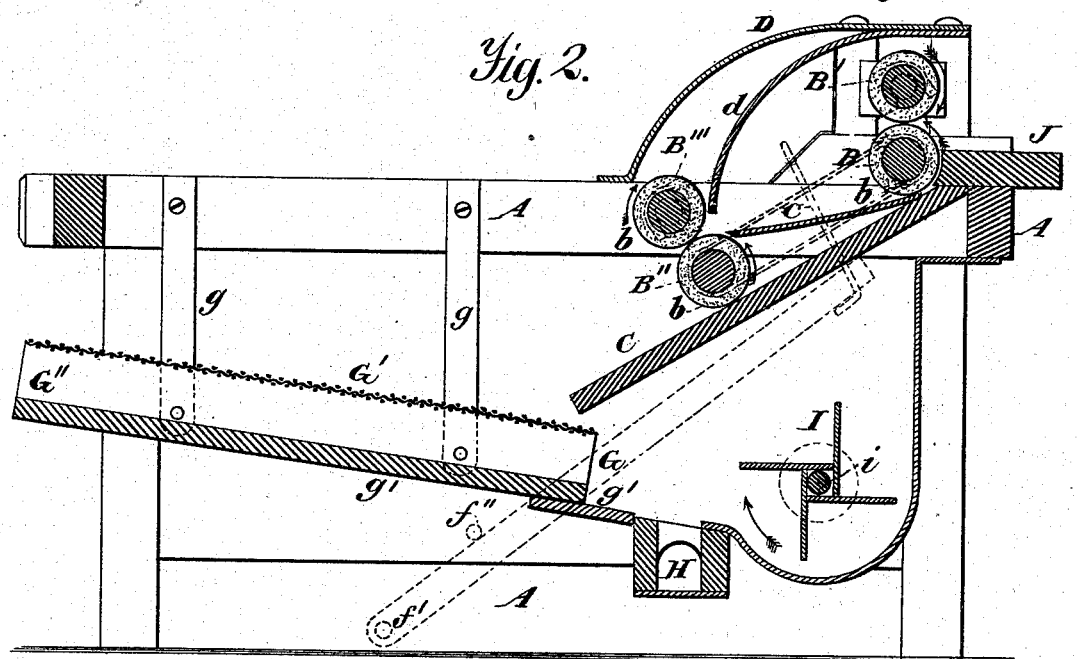
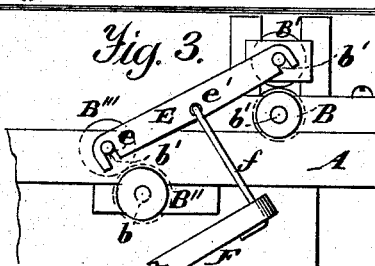
Witnesses.
A. Ruppert.
C. M. Connell
S. Brown
Inventor:
Holloway & Blanchard
Att'ys

UNITED STATES PATENT OFFICE.

SETH BROWN, OF RICHMOND, INDIANA.

MACHINE FOR CRUSHING FLAX-BOLLS.

SPECIFICATION forming part of Letters Patent No. 251,691, dated January 3, 1882.

Application filed October 11, 1881. (Model.)

*To all whom it may concern:*

Be it known that I, SETH BROWN, a citizen of the United States, residing at Richmond, in the county of Wayne and State of Indiana, have invented certain new and useful Improvements in Machines for Crushing Flax-Bolls; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to a machine for crushing the bolls or seed-pods of flax, so that the seed may thereafter be completely separated from the straw and from any of the broken pieces of the bolls that may result from the operation of crushing; and it consists in the construction and arrangement of the parts of the machine, as will be hereinafter described.

In the drawings, Figure 1 represents a top or plan view of the device with portions of the frame and cover removed. Fig. 2 represents a longitudinal sectional view, and Fig. 3 represents details of construction of parts.

A represents the frame of the machine, within which the operating parts are contained.

B and B' are a pair of crushing-rollers placed transversely across the frame A, and B'' and B''' are a second pair of crushing-rollers, placed a little distance in the rear of and lower down than the rollers B and B'. All these rollers are constructed to have flexible or yielding surfaces $b$, such as india-rubber, or any other substance of such texture as will crush the seed-bolls without crushing the seed itself. The rollers are built upon shafts $b'$, that revolve in proper bearings in or attached to frame A.

Motion is imparted to roller B'' from any prime mover through a belt passing over pulley $b''$, and thence to roller B by a belt passing over pulleys $b'''$ and $b^4$, the passing of the flax imparting motion to the rollers B' and B''', which revolve in the direction indicated by the arrows in Fig. 2.

C is an inclined chute or floor underneath the two pairs of rollers. $c$ is a yielding apron above chute C, at the upper end, and under roller B, while its lower edge is above the lower roller, B'', and will direct everything that passes the first rollers, B and B', between the lower rollers, B'' and B'''.

D is a curved cover over the two pairs of rollers, and $d$ is a curved deflector-plate over the first pair of rollers, curved to come back of and near to the upper roller, B''', of the lower pair, thus preventing any of the seed escaping over the top of roller B''', while it and the apron $c$ will direct and insure the passage between rollers B'' and B''' of all that passes through between the first rollers, B and B', so that if any of the bolls or seed-cells happen to pass between the first rollers without being crushed the last pair will surely effect that result.

E E are yokes, made of metal, with slots $e$ $e$ in their lower edges, to fit upon and over the outer ends of each of the shafts $b'$ of the free or yielding rollers B' and B''', as seen in Fig. 3. In or near the center of each of these yokes E E is a hole, $e'$, into which is hooked a connecting link or rod, $f$, that then goes at or nearly at right angles with the inclined yokes and downward to and through a spring-lever, F, which is pivoted to frame A at $f'$, and the upper side of which bears against a fulcrum-pin, $f''$. Each side of the machine has these yokes and spring-lever, so that when there is an inequality of feed the upper rollers, B' and B''', will yield or give way through the spring of levers F and let the bunch or mass of flax-straw through without clogging.

G is a swinging frame, hung or suspended near its four corners upon pivoted bars $g$, with its forward end lower than its rear end, and is covered on its top side with a screen, G', while the lower or bottom edge, $g'$, is floured over, so that it forms a chute to throw the separated and clean flaxseed forward and down into chute H, and thence out of the machine.

I is a fan-blower on transverse shaft $i$, which revolves in suitable bearings in frame A, and gets its motion from pulley $i'$ on shaft $b'$ of roller B through a belt over pulley $i''$ on shaft $i$. The fan I revolves in the direction indicated by the arrow, and causes an air-current to flow through and over the swinging or vibrating frame G, carrying all light chaff or straw that may have fallen through the screen out of the machine through the rear and open end, G''. The flax-straw, after passing through the crushing-rollers, is carried rearward and out of the machine by the ordinary device used in thrashing-machines, and is not shown here. The screen-frame G is vibrated longitudinally or transversely by any known mechanical device.

J is a table, over which the flax-straw is fed to and between the first pair of rollers, B and B'.

By this construction of yielding and flexible rollers in pairs, so arranged that the flax-bolls will pass between the two pairs of rollers, a complete crushing of the seed-pods takes place, and all the seed in the bolls is free to leave and be separated, after being crushed, from all the other portions of the flax-plant.

I am aware of Patent No. 153,259, in which two pairs of rollers are used, the first pair less in diameter than the second pair and revolving at greater speed. The rollers in this patent are plain and smooth, and the surfaces do not yield, as such surfaces rub as well as crush.

I do not claim, broadly, two pairs of rollers, as they are in use; but,

Having fully described my invention, what I claim, and desire to secure by Letters Patent, is—

1. In a machine for shelling or thrashing flaxseed, the combination of two pairs of yielding-surfaced rollers, B B' and B'' B''', the yielding apron c, and the curved deflector d, for conducting the material from the first pair of rollers to the second pair, said rollers B and B' being arranged in a higher plane than that of B'' and B''', substantially as and for the purpose set forth.

2. In a machine for shelling or thrashing flaxseed, the combination of two pairs of rollers arranged in different planes, the yokes E, connecting the upper roller of each pair, the spring F, and the connecting-rod f, substantially as and for the purpose described.

In testimony whereof I affix my signature in presence of two witnesses.

SETH BROWN.

Witnesses:
WILLIAM H. PICKETT,
EVETT PICKETT.